(12) United States Patent
Huang

(10) Patent No.: US 12,537,928 B2
(45) Date of Patent: Jan. 27, 2026

(54) CURVED AUTOSTEREOSCOPIC DISPLAY AND METHOD FOR MANUFACTURING THE SAME

(71) Applicant: Acer Incorporated, New Taipei (TW)

(72) Inventor: Chao-Shih Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 86 days.

(21) Appl. No.: 18/535,286

(22) Filed: Dec. 11, 2023

(65) Prior Publication Data
US 2024/0340401 A1 Oct. 10, 2024

(30) Foreign Application Priority Data
Apr. 7, 2023 (TW) ................................. 112112992

(51) Int. Cl.
*H04N 13/305* (2018.01)

(52) U.S. Cl.
CPC ..... *H04N 13/305* (2018.05); *H04N 2213/001* (2013.01)

(58) Field of Classification Search
CPC .... G02B 30/27; G02B 27/0172; G02B 30/30; G02B 30/29; H04N 13/305; H04N 13/31; H04N 13/317; G02F 1/133305; G02F 1/133526; G06F 1/1652; H10K 2102/311; G09F 9/301; G09G 3/03; G09G 2354/00
See application file for complete search history.

(56) References Cited

U.S. PATENT DOCUMENTS

2008/0018732 A1 * 1/2008 Moller ................ H04N 13/363
348/E13.058

FOREIGN PATENT DOCUMENTS

| CN | 103957400 A | 7/2014 |
|---|---|---|
| CN | 109089104 A | 12/2018 |

OTHER PUBLICATIONS

Chinese language office action dated Nov. 16, 2023, issued in application No. TW 112112992.

* cited by examiner

*Primary Examiner* — Farhan Mahmud
(74) *Attorney, Agent, or Firm* — McClure, Qualey & Rodack, LLP

(57) ABSTRACT

A method for manufacturing a curved autostereoscopic display is provided. The method includes providing a curved panel. The curved panel has a panel arc length and a resolution. The method includes obtaining the optimal viewing distance based on the arc length and the resolution of the curved panel. The method includes determining the allowable curvature radius of the curved panel based on the panel arc length, the optimal viewing distance, and the allowable value. The method includes determining the actual curvature radius of the curved panel based on the optimal viewing distance or the allowable curvature radius.

20 Claims, 6 Drawing Sheets

CURVED AUTOSTEREOSCOPIC DISPLAY AND METHOD FOR MANUFACTURING THE SAME

CROSS REFERENCE TO RELATED APPLICATIONS

This Application claims priority of Taiwan Patent Application No. 112112992, filed on Apr. 7, 2023, the entirety of which is incorporated by reference herein.

BACKGROUND OF THE INVENTION

Field of the Invention

The embodiments of the present disclosure relate to a curved autostereoscopic display and a method of manufacturing the same, and in particular they relate to a curved autostereoscopic display with no ghosting and high resolution, and a method of manufacturing the same.

Description of the Related Art

Crosstalk is usually a standard used to measure the quality of three-dimensional stereoscopic displays. Crosstalk is a measure of the proportion of display data on the screen that goes to the wrong eye. For example, the ratio of data for the left (or right) eye that is mistakenly projected into the right (or left) eye. The optimal value for crosstalk is 0% in a three-dimensional stereoscopic display, while in a two-dimensional display the optimal value for the crosstalk is expected to be 100%, because there is no parallax between the left and right eyes in a two-dimensional display. An autostereoscopic display allows users to view three-dimensional images without using other equipment. However, existing autostereoscopic displays are usually flat panel displays. If a flat panel autostereoscopic display shows a three-dimensional image, and if the user gradually looks toward the left or right side of the flat panel autostereoscopic display, the three-dimensional crosstalk of the three-dimensional image will increase, and the ghosting in the three-dimensional image becomes more obvious to the user.

If a flat panel autostereoscopic display shows a two-dimensional image, and if the user looks toward the left or right side of the flat panel autostereoscopic display, the two-dimensional crosstalk of the two-dimensional image is reduced due to the geometric optics of the stereoscopic lenticular mirror, but the two-dimensional display has no parallax between the left and right eyes. The reduction in two-dimensional crosstalk means that the two eyes see differently and cannot reach the resolution of native two-dimensional displays.

Curved autostereoscopic displays may be used to reduce three-dimensional crosstalk in three-dimensional images and improve the two-dimensional crosstalk of two-dimensional images to solve the problems of ghosting in three-dimensional images and reduced resolution of two-dimensional images.

However, the design of the curvature radius of the curved autostereoscopic display plays a key role. A suitable curvature radius for a curved autostereoscopic display may effectively solve the problems of ghosting in three-dimensional images and reduced resolution of two-dimensional images. Therefore, a curved autostereoscopic display and a method of manufacturing the same are desired to solve the existing problems.

BRIEF SUMMARY OF THE INVENTION

An embodiment of the present invention provides a method for manufacturing a curved autostereoscopic display. The method includes providing a curved panel, wherein the curved panel has a panel arc length and a resolution. The method includes obtaining the optimal viewing distance based on the arc length and the resolution of the curved panel. The method includes determining the allowable curvature radius of the curved panel based on the panel arc length, the optimal viewing distance, and an allowable value. The method includes determining the actual curvature radius of the curved panel based on the optimal viewing distance or the allowable curvature radius.

In some embodiments, the step of determining the actual curvature radius of the curved panel based on the optimal viewing distance or the allowable curvature radius includes using the allowable curvature radius as the actual curvature radius of the curved panel if the optimal viewing distance cannot be used as the actual curvature radius of the curved panel.

In some embodiments, the step of determining the allowable curvature radius of the curved panel based on the panel arc length, the optimal viewing distance, and the allowable value includes calculating the allowable curvature radius using the following calculation formula: (½×the panel arc length)÷(((½×the panel arc length)÷the optimal viewing distance)−the allowable value).

In some embodiments, the allowable value is between greater than 0 and 10°.

In some embodiments, the method for manufacturing a curved autostereoscopic display further including: determining a second allowable curvature radius of the curved panel based on the panel arc length, the optimal viewing distance and a second allowable value; wherein the step of determining a second allowable curvature radius of the curved panel based on the panel arc length, the optimal viewing distance and a second allowable value includes: calculating the second allowable curvature radius using the following calculation formula: (½× the panel arc length)÷(((½× the panel arc length)÷the optimal viewing distance)−the second allowable value); wherein the second allowable value is greater than the allowable value.

In some embodiments, the step of determining the actual curvature radius of the curved panel based on the optimal viewing distance or the allowable curvature radius includes: using the second allowable curvature radius as the actual curvature radius of the curved panel if the optimal viewing distance and the allowable curvature radius cannot be used as the actual curvature radius of the curved panel.

In some embodiments, the second allowable value is between greater than 0 and 100.

In some embodiments, the allowable value is 3°, and the second allowable value is 5°.

An embodiment of the present invention provides a method for manufacturing a curved autostereoscopic display. The method includes providing a curved panel. The curved panel has a panel arc length and a resolution. The method includes obtaining the optimal viewing distance based on the arc length of the curved panel and the resolution. The method includes determining the allowable curvature radius of the curved panel based on the panel arc length, the optimal viewing distance, and the allowable value. The method includes using the allowable curvature radius as the actual curvature radius of the curved panel.

In some embodiments, the method for manufacturing a curved autostereoscopic display further includes determining whether using the allowable curvature radius as the actual curvature radius of the curved panel meets the process conditions or not. The method further includes determining a new allowable value if using the allowable curvature radius as the actual curvature radius of the curved panel does not meet the process conditions. The method further includes determining a new allowable curvature radius based on the new allowable value.

In some embodiments, the new allowable value is greater than the allowable value.

In some embodiments, if the original allowable value is 3°, the new allowable value is 5°.

In some embodiments, the method for manufacturing a curved autostereoscopic display as claimed in claim 10, further includes repeating the step of determining whether using the allowable curvature radius as the actual curvature radius of the curved panel meets the process conditions or not, the step of determining a new allowable value if using the allowable curvature radius as the actual curvature radius of the curved panel does not meet the process conditions, and the step of determining a new allowable curvature radius based on the new allowable value, until using the allowable curvature radius as the actual curvature radius of the curved panel meets the process conditions.

In some embodiments, the method for manufacturing a curved autostereoscopic display further includes using the allowable curvature radius as the actual curvature radius if the allowable curvature radius meets the process conditions.

An embodiment of the present invention provides a curved autostereoscopic display, including a curved panel. The curved panel has a panel arc length and an actual curvature radius. The actual curvature radius is the allowable curvature radius. The allowable curvature radius is greater than the optimal viewing distance.

In some embodiments, the allowable curvature radius is: (½× the panel arc length)÷(((½× the panel arc length)÷the optimal viewing distance)−the allowable value).

In some embodiments, the allowable value is greater than 0 and 10°.

In some embodiments, the allowable value is between greater than 0 and 5°.

In some embodiments, the allowable value is 3°.

In some embodiments, the allowable value is 5°.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
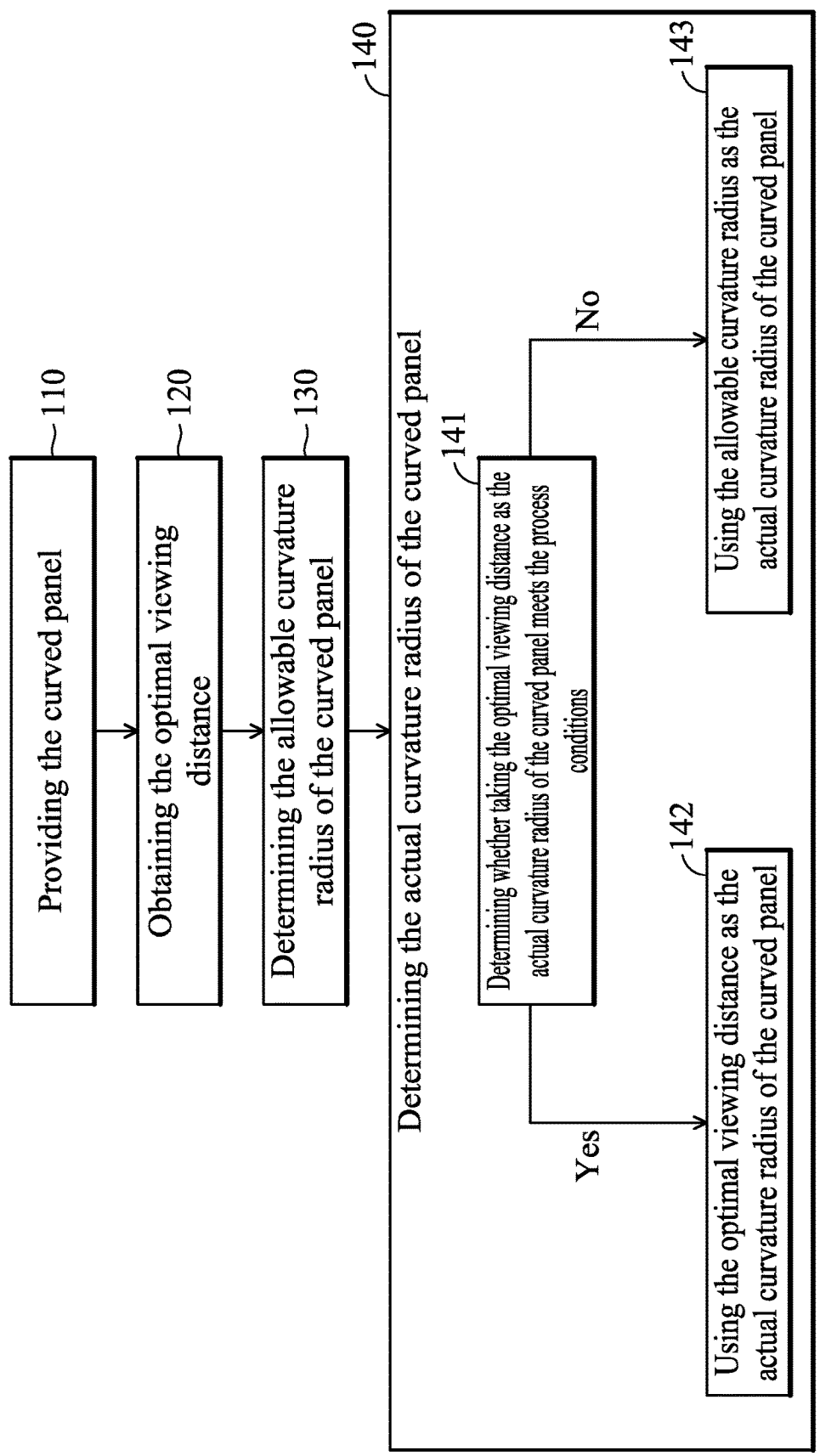
FIG. 1 is a schematic view of a manufacturing method of a curved autostereoscopic display according to some embodiments of the present disclosure.

The present disclosure may be more clearly understood by referring to the following description and the appended drawings. It should be noted that, for the sake of the simplicity of the drawings and comprehensibility for readers, only a portion of the light-emitting unit is illustrated in multiple figures in the present disclosure, and the specific components in the figures are not drawn to scale. In addition, the number and size of each component in the drawings merely serve as an example, and are not intended to limit the scope of the present disclosure. Furthermore, similar and/or corresponding numerals may be used in different embodiments for describing some embodiments simply and clearly, but they do not represent any relationship between different embodiments and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open-ended words, so they should be interpreted as meaning "including but not limited to . . . " Therefore, if the terms "including", "comprising", and/or "having" are used in the description of the disclosure, the presence of corresponding features, regions, steps, operations and/or components is specified without excluding the presence of one or more other features, regions, steps, operations and/or components.

The terms "about,", "essentially," or "substantially" are generally interpreted as within 20% of a given value or range, or as interpreted as within 10%, 5%, 3%, 2%, 1%, or 0.5% of a given value or range.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one having ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Please refer to FIG. 1. FIG. 1 is a schematic view of a manufacturing method 100 of a curved autostereoscopic display according to some embodiments of the present disclosure. As shown in FIG. 1, method 100 may include operation 110, operation 120, operation 130, and operation 140.

In operation 110, a curved panel may be provided. The curved panel may be used to manufacture autostereoscopic display panels. The curved panel may have a curved shape.

In operation 120, an optimal viewing distance (OVD) may be obtained. According to some embodiments of the present disclosure, the optimal viewing distance may be calculated and obtained based on the panel arc length and resolution of the curved panel. According to some embodiments of the present disclosure, known methods or calculation formulas may be used to calculate and obtain the optimal viewing distance.

In operation 130, an allowable curvature radius of the curved panel may be determined. According to some embodiments of the present disclosure, the allowable curvature radius of the curved panel may be determined based on the panel arc length, the optimal viewing distance, and an allowable value.

For example, the allowable curvature radius may be calculated with the following calculation formula: (½×panel arc length)÷(((½×panel arc length)÷optimal viewing distance)−allowable value).

According to some embodiments of the present disclosure, the allowable value may be between greater than 0 and about 10°. According to some preferred embodiments of the present disclosure, the allowable value may be between greater than 0 and about 5°. According to other preferred embodiments of the present disclosure, the allowable value may be between greater than about 3° and about 5°. For example, the allowable value may be approximately 3°. For example, the allowable value may be approximately 5°.

It should be noted that there may be other ranges or specific values for the allowable value, and the particular range or specific value of the allowable value is not limited to the examples provided in this disclosure.

Adding the allowable value to the calculation formula may change the allowable curvature radius, so that the allowable curvature radius may be different from the optimal viewing distance. For example, the allowable curvature radius may be larger than the optimal viewing distance.

In operation 140, the actual curvature radius of the curved panel may be determined. According to some embodiments of the present disclosure, the actual curvature radius may be determined based on the optimal viewing distance or the allowable curvature radius.

The operation 140 may include operation 141. In operation 141, it is determined whether taking the optimal viewing distance as the actual curvature radius of the curved panel meets the process conditions or not.

If using the optimal viewing distance as the actual curvature radius of the curved panel meets the process conditions, then proceed to operation 142. If using the optimal viewing distance as the actual curvature radius of the curved panel does not meet the process conditions, then proceed to operation 143.

In operation 142, the optimal viewing distance is used as the actual curvature radius of the curved panel. Using the optimal viewing distance as the actual curvature radius of the curved panel may effectively reduce the three-dimensional crosstalk of the three-dimensional stereoscopic images on the three-dimensional stereoscopic display and improve the two-dimensional crosstalk of the two-dimensional images, thus the problem of ghosting of the three-dimensional stereoscopic images and reduced resolution of two-dimensional images are effectively solved.

In operation 143, if the optimal viewing distance cannot be used as the actual curvature radius of the curved panel, the allowable curvature radius may be used as the actual curvature radius of the curved panel.

Since the allowable curvature radius may be greater than the optimal viewing distance, when the allowable curvature radius is used as the actual curvature radius of the curved panel, the curvature radius of the curved panel is smaller, and thus the curved panel have the advantages of simple manufacturing and lower cost.

Figure 2:
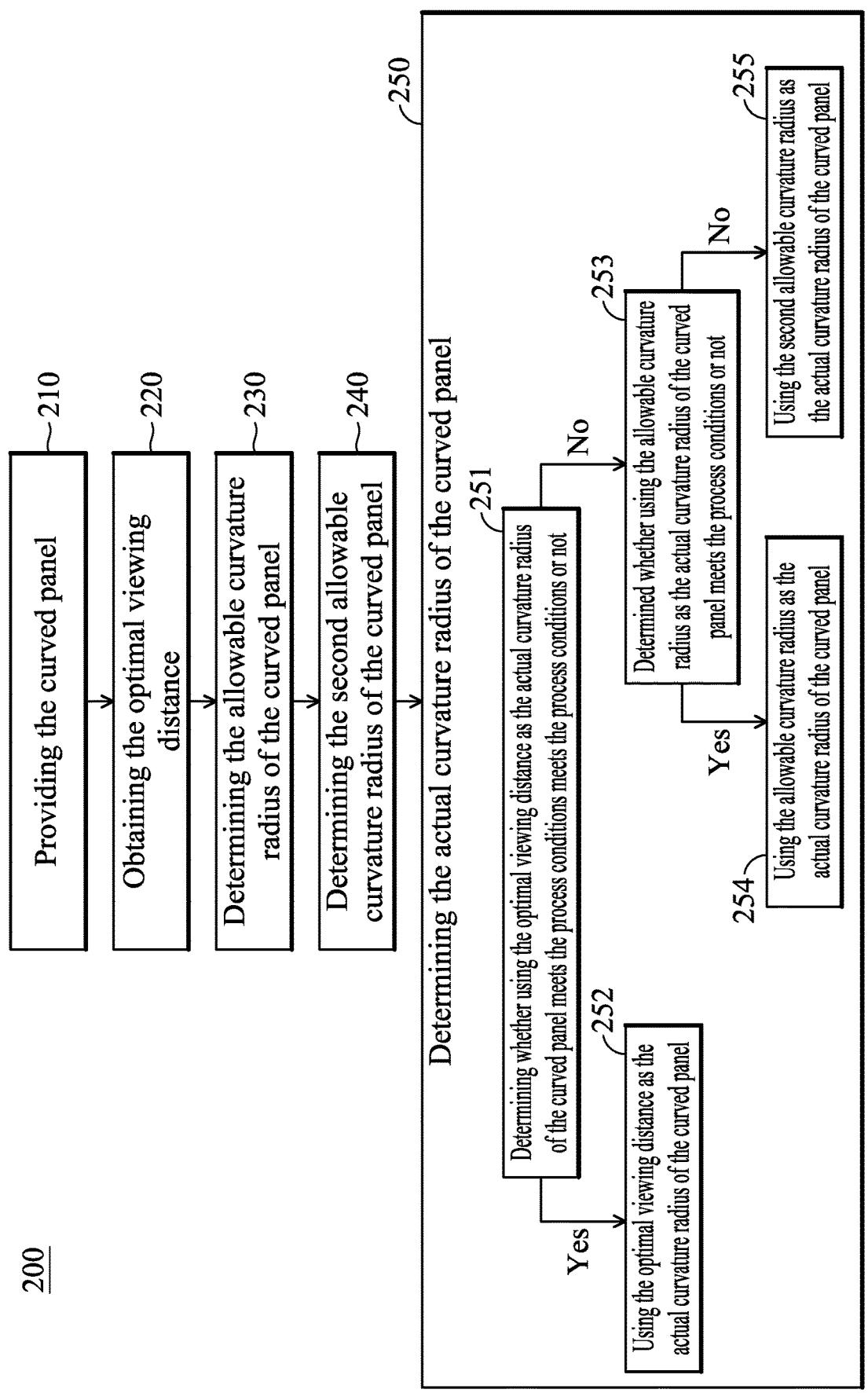
FIG. 2 is a schematic view of a manufacturing method of a curved autostereoscopic display according to some embodiments of the present disclosure.

Please refer to FIG. 2. FIG. 2 is a schematic view of a manufacturing method 200 of a curved autostereoscopic display according to some embodiments of the present disclosure. As shown in FIG. 2, method 200 may include operation 210, operation 220, operation 230, operation 240, and operation 250.

The operation 210, operation 220, and operation 230 of the method 200 may be similar to the operation 110, operation 120, and operation 130 of the method 100, respectively, and they will not be described again.

In operation 240, a second allowable curvature radius of the curved panel may be determined. According to some embodiments of the present disclosure, the second allowable curvature radius of the curved panel may be determined based on the panel arc length, the optimal viewing distance and a second allowable value.

For example, the second allowable curvature radius may be calculated with the following calculation formula: (½×panel arc length)÷(((½×panel arc length)÷optimal viewing distance)−second allowable value).

According to some embodiments of the present disclosure, the second allowable value may be different from the allowable value. For example, the second allowable value may be greater than the allowable value.

According to some embodiments of the present disclosure, the second allowable value may be between greater than 0 and approximately 10°. According to some preferred embodiments of the present disclosure, the second allowable value may be between greater than 0 and approximately 5°. According to other preferred embodiments of the present disclosure, the second allowable value may be between greater than about 3° and about 5°. For example, the second allowable value may be approximately 5°.

It should be noted that there may be other applicable ranges or specific values for the second allowable value, and the range or specific value of the second allowable value is not limited to the example provided in this disclosure.

Adding the second allowable value to the calculation formula may change the second allowable curvature radius, so that the second allowable curvature radius may be different from the optimal viewing distance and the allowable curvature radius. For example, the second allowable curvature radius may be greater than the optimal viewing distance and the allowable curvature radius.

In operation 250, the actual curvature radius of the curved panel may be determined. According to some embodiments of the present disclosure, the actual curvature radius may be determined based on the optimal viewing distance or the allowable curvature radius.

Operation 250 may include operation 251. In operation 251, it may be determined whether using the optimal viewing distance as the actual curvature radius of the curved panel meets the process conditions meets the process conditions or not.

If using the optimal viewing distance as the actual curvature radius of the curved panel meets the process conditions, then proceed to operation 252. If using the optimal viewing distance as the actual curvature radius of the curved panel does not meet the process conditions, then proceed to operation 253.

In operation 252, the optimal viewing distance is used as the actual curvature radius of the curved panel. Using the optimal viewing distance as the actual curvature radius of the curved panel may effectively reduce the three-dimensional crosstalk of the three-dimensional stereoscopic images on the three-dimensional stereoscopic display and improve the two-dimensional crosstalk of the two-dimensional images, thus the problem of ghosting of the three-dimensional stereoscopic images and reduced resolution of two-dimensional images are effectively solved.

In operation 253, if the optimal viewing distance cannot be used as the actual curvature radius of the curved panel, it may be determined whether using the allowable curvature radius as the actual curvature radius of the curved panel meets the process conditions or not.

If using the allowable curvature radius as the actual curvature radius of the curved panel meets the process conditions, then proceed to operation 254. If using the allowable curvature radius as the actual curvature radius of the curved panel does not meet the process conditions, then proceed to operation 255.

In operation 254, if the optimal viewing distance cannot be used as the actual curvature radius of the curved panel, and if using the allowable curvature radius as the actual curvature radius of the curved panel meets the process conditions, the allowable curvature radius is used as the actual curvature radius of the curved panel.

Since the allowable curvature radius may be greater than the optimal viewing distance, when the allowable curvature radius is used as the actual curvature radius of the curved panel, the curvature radius of the curved panel is smaller, and thus the curved panel have the advantages of simple manufacturing and lower cost.

In operation 255, if the optimal viewing distance and the allowable curvature radius cannot be used as the actual curvature radius of the curved panel, using the second allowable curvature radius as the actual curvature radius of the curved panel.

Since the second allowable curvature radius may be greater than the optimal viewing distance and the allowable curvature radius, when the allowable curvature radius is used as the actual curvature radius of the curved panel, the curvature radius of the curved panel is smaller, and thus the curved panel have the advantages of simple manufacturing and lower cost.

Figure 3:
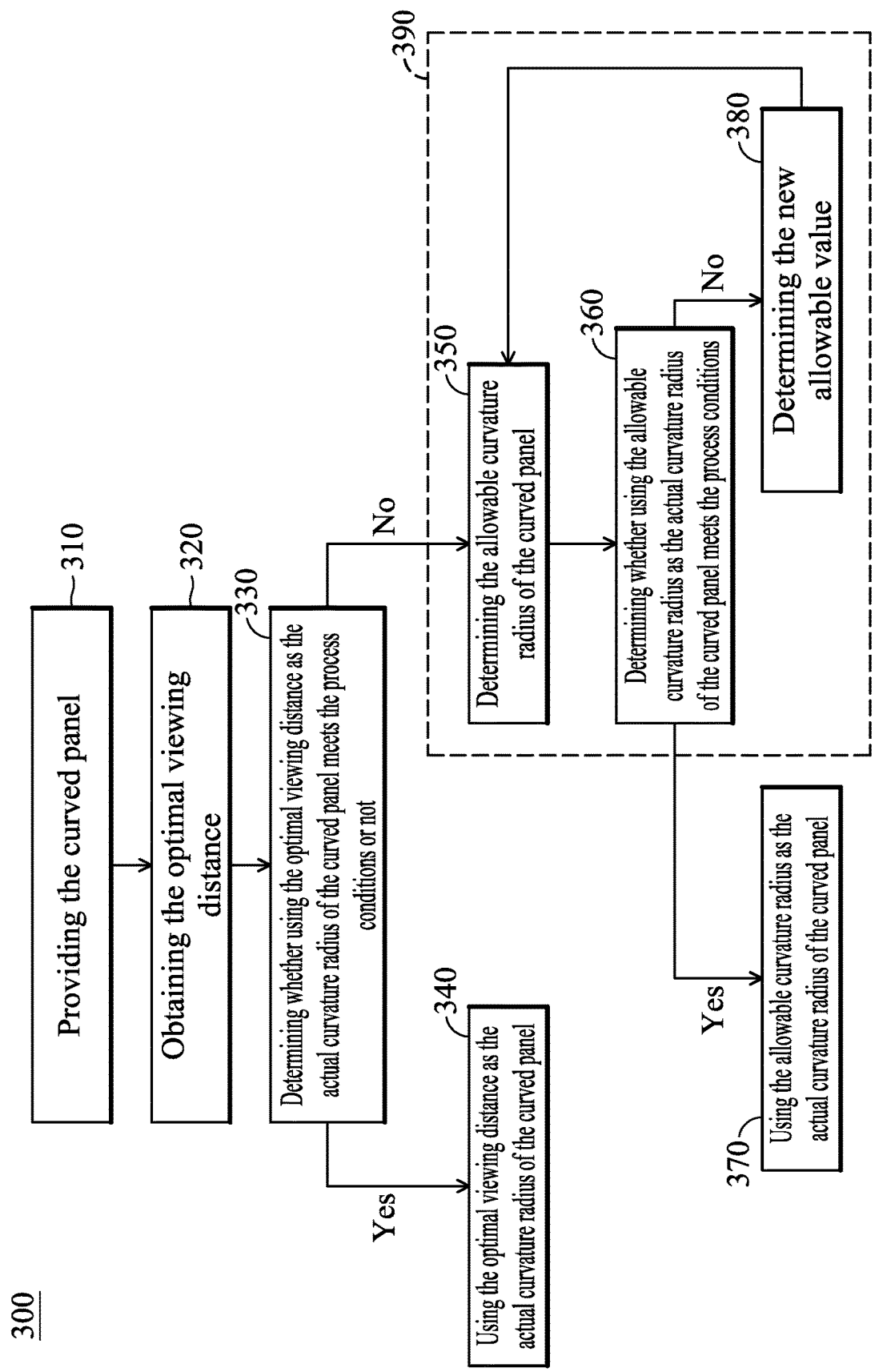
FIG. 3 is a schematic view of a manufacturing method of a curved autostereoscopic display according to some embodiments of the present disclosure.

Please refer to FIG. 3. FIG. 3 is a schematic view of a manufacturing method 300 of a curved autostereoscopic display according to some embodiments of the present disclosure. As shown in FIG. 3, method 300 may include operation 310, operation 320, operation 330, operation 340, operation 350, operation 360, operation 370, operation 380, and loop 390.

In operation 310, a curved panel may be provided. The curved panel may be used to manufacture autostereoscopic displays. The curved panel may have a curved shape.

The operation 310 and operation 320 of the method 300 may be similar to the operation 110 and operation 120 of the method 100, respectively, and they will not be described again.

In operation 330, determining whether using the optimal viewing distance as the actual curvature radius of the curved panel meets the process conditions or not.

If using the optimal viewing distance as the actual curvature radius of the curved panel meets the process conditions, then proceed to operation 340. If using the optimal viewing distance as the actual curvature radius of the curved panel does not meet the process conditions, then proceed to operation 350.

In operation 340, using the optimal viewing distance as the actual curvature radius of the curved panel. Using the optimal viewing distance as the actual curvature radius of the curved panel may effectively reduce the three-dimensional crosstalk of the three-dimensional stereoscopic images on the three-dimensional stereoscopic display and improve the two-dimensional crosstalk of the two-dimensional images, thus the problem of ghosting of the three-dimensional stereoscopic images and reduced resolution of two-dimensional images are effectively solved.

In operation 350, the allowable curvature radius of the curved panel is determined. According to some embodiments of the present disclosure, the allowable curvature radius may be calculated according to the following calculation formula: (½×panel arc length)÷(((½×panel arc length)÷optimal viewing distance)−allowable value).

According to some embodiments of the present disclosure, the allowable value may be between greater than 0 and about 10°. According to some preferred embodiments of the present disclosure, the allowable value may be between greater than 0 and about 5°. According to other preferred embodiments of the present disclosure, the allowable value may be between greater than about 3° and about 5°. For example, the allowable value may be approximately 3°. For example, the allowable value may be approximately 5°.

It should be noted that there may be other applicable ranges or specific values for the allowable value, and the range or specific value of the allowable value is not limited to the examples provided in this disclosure.

In operation 360, it is determined whether using the allowable curvature radius as the actual curvature radius of the curved panel meets the process conditions.

If using the allowable curvature radius as the actual curvature radius of the curved panel meets the process conditions, then operation 370 is performed. If using the allowable curvature radius as the actual curvature radius of the curved panel does not meet the process conditions, then proceed to operation 380.

In operation 370, the allowable curvature radius is used as the actual curvature radius of the curved panel. Since the allowable curvature radius may be greater than the optimal viewing distance, when the allowable curvature radius is used as the actual curvature radius of the curved panel, the curvature radius of the curved panel is smaller, and thus the curved panel have the advantages of simple manufacturing and lower cost.

In operation 380, a new allowable value is determined. The new allowable value may be greater than the original allowable value. For example, if the original allowable value is about 3°, the new allowable value may be about 5°.

After operation 380, may be returned to operation 350 to determine a new allowable curvature radius based on the new allowable value.

The operation 350, operation 360, and operation 380 may form a loop 390 (shown as a dashed box). The loop 390 may repeat operation 350, operation 360, and operation 380 until using the allowable curvature radius as the actual curvature radius of the curved panel meet the process conditions.

Figure 4:
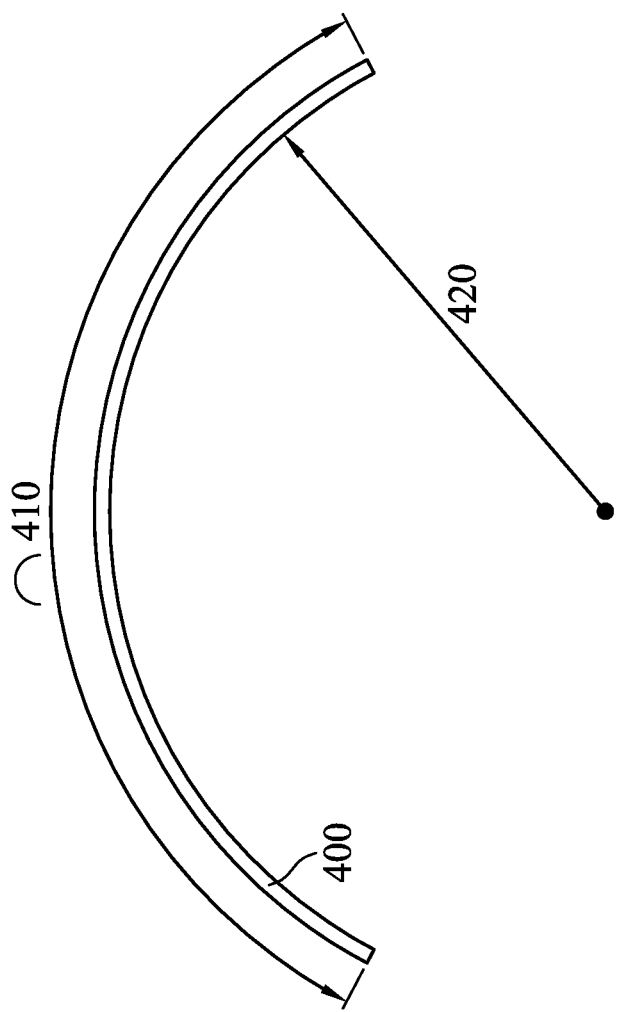
FIG. 4 is a schematic view of a curved panel of a curved autostereoscopic display according to some embodiments of the present disclosure.

Please refer to FIG. 4, FIG. 4 is a schematic view of a curved panel 400 of a curved autostereoscopic display according to some embodiments of the present disclosure. The curved panel 400 may have a panel arc length 410 and an actual curvature radius 420.

The actual curvature radius 420 may be the optimal viewing distance or the allowable curvature radius. The optimal viewing distance may be a known function of the arc length 410 of the panel and the resolution of the curved panel 400. The allowable curvature radius may be: (½× panel arc length)÷(((½×panel arc length)÷optimal viewing distance)−allowable value).

According to some embodiments of the present disclosure, the allowable value may be between greater than 0 and about 10°. According to some preferred embodiments of the present disclosure, the allowable value may be between greater than 0 and about 5°. According to other preferred embodiments of the present disclosure, the allowable value may be between 3° and 5°. For example, the allowable value may be approximately 3°. For example, the allowable value may be approximately 5°.

Figure 5:
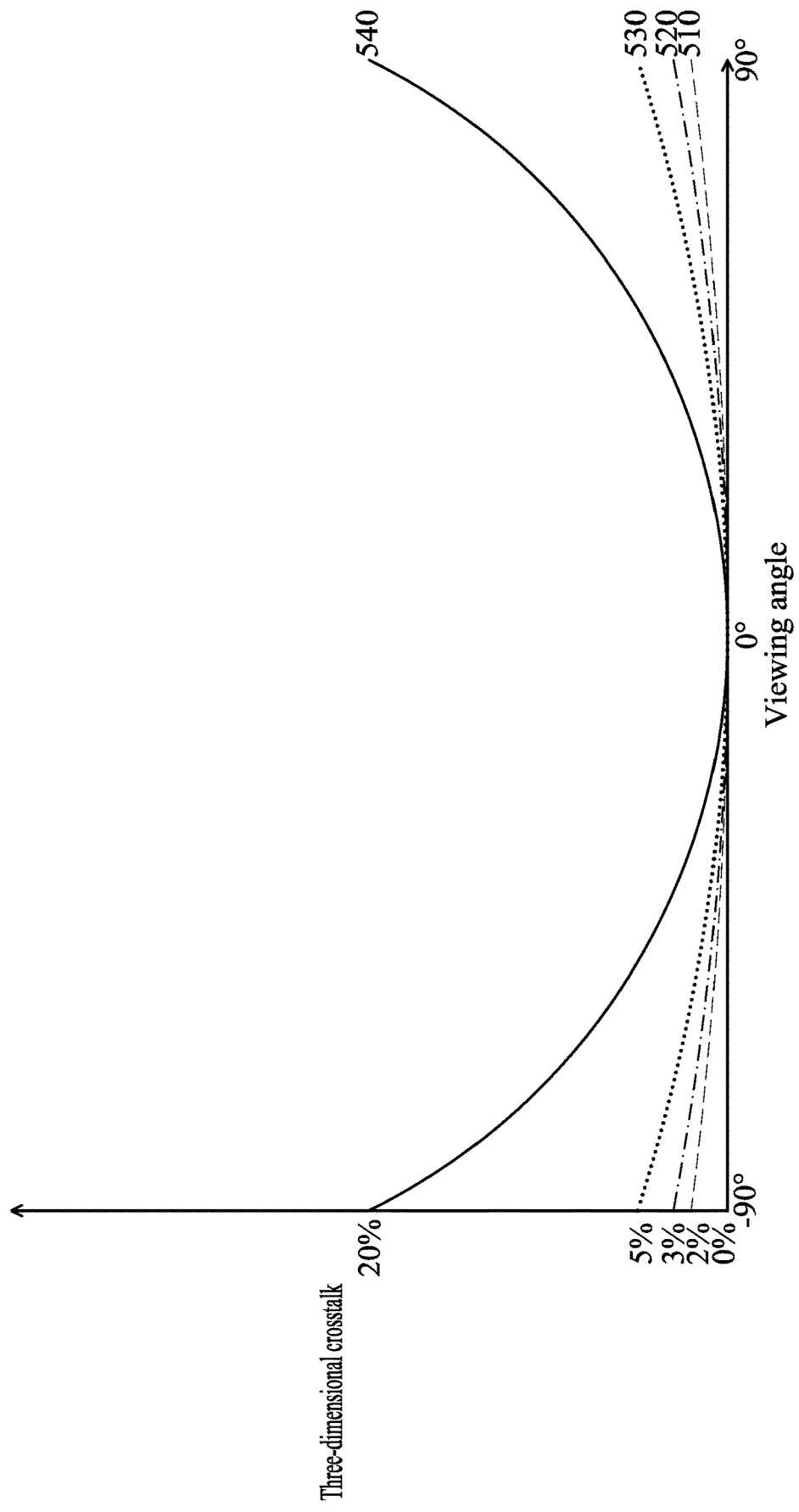
FIG. 5 is a schematic view of three-dimensional crosstalk of three-dimensional stereoscopic images with different autostereoscopic displays.

Please refer to FIG. 5. FIG. 5 is a schematic view of three-dimensional crosstalk of three-dimensional stereoscopic images with different autostereoscopic displays. FIG. 5 shows line 510, line 520, line 530, and line 540.

Line 510 is the three-dimensional crosstalk of the three-dimensional image of the curved autostereoscopic display with the optimal viewing distance as the actual curvature radius. line 510 may have about 2% three-dimensional crosstalk if the viewing angle is 90° (right side) or −90° (left side). Therefore, the three-dimensional stereoscopic image of a curved autostereoscopic display with the optimal viewing distance as the actual curvature radius is clear and has no ghosting.

Line 520 is the three-dimensional crosstalk of the three-dimensional image of the curved autostereoscopic display with the allowable curvature radius as the actual curvature radius, wherein the allowable value is 3°. Line 520 may have less than about 3% three-dimensional crosstalk if the viewing angle is 90° or −90°. Therefore, the three-dimensional stereoscopic image of a curved autostereoscopic display with an allowable curvature radius of 3° as the actual curvature radius is clear and has no ghosting.

Line 530 is the three-dimensional crosstalk of the three-dimensional image of the curved autostereoscopic display with the allowable curvature radius as the actual curvature radius, wherein the allowable value is 5°. Line 530 may have less than about 5% three-dimensional crosstalk if the viewing angle is 90° or −90°. Therefore, the three-dimensional image of a curved autostereoscopic display with an allowable curvature radius of 5° as the actual curvature radius is clear and has no ghosting.

Line 540 is the three-dimensional crosstalk of the three-dimensional stereoscopic image of the flat panel autostereoscopic display. Line 540 has approximately 20% three-dimensional crosstalk if the viewing angle is 90° or −90°. Therefore, the three-dimensional stereoscopic image produced by a flat panel autostereoscopic display has ghosting.

Figure 6:
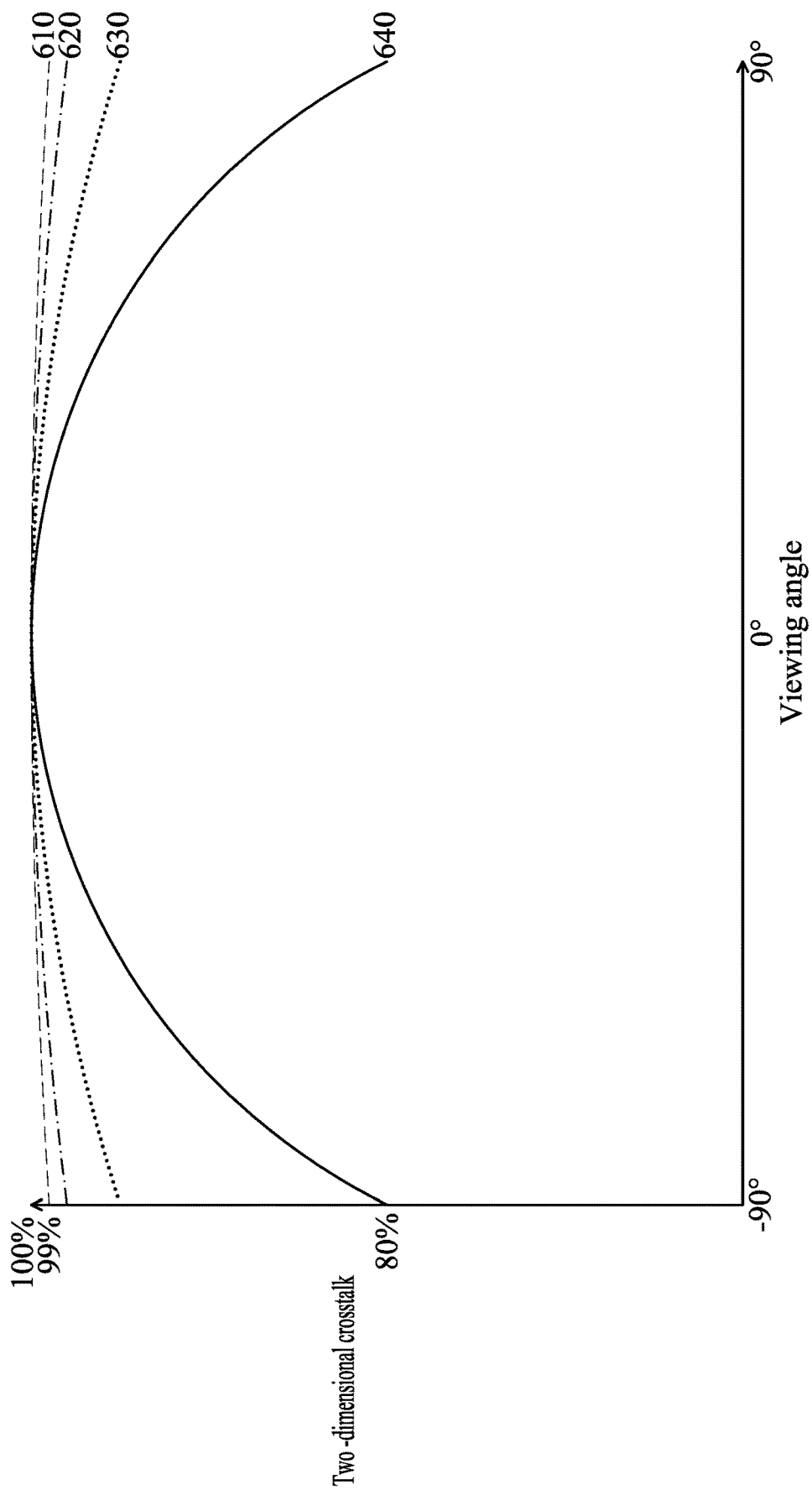
FIG. 6 is a schematic view of two-dimensional crosstalk of two-dimensional images with different autostereoscopic displays.

Please refer to FIG. 6, FIG. 6 is a schematic view of two-dimensional crosstalk of two-dimensional images with different autostereoscopic displays. FIG. 6 shows line 610, line 620, line 630, and line 640.

Line 610 is the two-dimensional crosstalk of the two-dimensional image of the curved autostereoscopic display with the optimal viewing distance as the actual curvature radius. Line 610 may have about 99% three-dimensional crosstalk if the viewing angle is 90° (right side) or −90° (left side). Therefore, the resolution of the two-dimensional image of the curved autostereoscopic display with the optimal viewing distance as the actual curvature radius is improved close to the native two-dimensional resolution.

Line 620 is the two-dimensional crosstalk of the two-dimensional image of the curved autostereoscopic display with the allowable curvature radius as the actual curvature radius, wherein the allowable value is 3°. Lines 620 may have quite high two-dimensional crosstalk if the viewing angle is 90° or −90°. Therefore, the resolution of the two-dimensional image of a curved autostereoscopic display with an allowable curvature radius of 3° as the actual curvature radius is much higher than that of a flat panel display.

Line 630 is the two-dimensional crosstalk of the two-dimensional image of the curved autostereoscopic display with the allowable curvature radius as the actual curvature radius, wherein the allowable value is 5°. Line 630 may have high two-dimensional crosstalk if the viewing angle is 90° or −90°. Therefore, the resolution of the two-dimensional image of a curved autostereoscopic display with an allowable curvature radius of 5° as the actual curvature radius is higher than that of a flat panel display.

Line 640 is the two-dimensional crosstalk of the two-dimensional image of the flat panel autostereoscopic display. Line 640 has lower two-dimensional crosstalk if the viewing angle is 90° or −90°. Therefore, the resolution of the two-dimensional image in a flat panel autostereoscopic display is attenuated due to the geometric optics of the stereoscopic lenticular mirror.

Embodiments of the present disclosure provide an advantageous method for manufacturing a curved autostereoscopic display. The manufacturing method of the curved autostereoscopic display disclosed in the present disclosure may produce a curved autostereoscopic display with no ghosting and high resolution within the constraints of existing process conditions, so as to enhance the user's viewing experience. Furthermore, the manufacturing method of the curved autostereoscopic display according to the embodiment of the present disclosure may also produce a curved autostereoscopic display with a lower curvature radius, thereby reducing the manufacturing difficulty and cost of the curved autostereoscopic display, and the display is avoided from producing ghosting at the same time. In addition, the manufacturing method of the curved autostereoscopic display according to the embodiment of the present disclosure may produce curved autostereoscopic displays with various panel arc lengths to meet market demands for displays with different sizes.

Although the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A method for manufacturing a curved autostereoscopic display, comprising:
   providing a curved panel, wherein the curved panel has a panel arc length and a resolution;
   obtaining an optimal viewing distance based on the panel arc length and the resolution of the curved panel;
   determining an allowable curvature radius of the curved panel based on the panel arc length, the optimal viewing distance and an allowable value;
   determining an actual curvature radius of the curved panel based on the optimal viewing distance or the allowable curvature radius.

2. The method for manufacturing a curved autostereoscopic display as claimed in claim 1, wherein the step of determining the actual curvature radius of the curved panel based on the optimal viewing distance or the allowable curvature radius comprises:
   using the allowable curvature radius as the actual curvature radius of the curved panel if the optimal viewing distance cannot be used as the actual curvature radius of the curved panel.

3. The method for manufacturing a curved autostereoscopic display as claimed in claim 1,
   wherein the step of determining the allowable curvature radius of the curved panel based on the panel arc length, the optimal viewing distance and the allowable value comprises:
   calculating the allowable curvature radius using the following calculation formula: (½×the panel arc length) ÷(((½×the panel arc length)÷the optimal viewing distance)−the allowable value).

4. The method for manufacturing a curved autostereoscopic display as claimed in claim 1, wherein the allowable value is between 0 and 10°.

5. The method for manufacturing a curved autostereoscopic display as claimed in claim 1, further comprising:
   determining a second allowable curvature radius of the curved panel based on the panel arc length, the optimal viewing distance and a second allowable value;
   wherein the step of determining a second allowable curvature radius of the curved panel based on the panel arc length, the optimal viewing distance and a second allowable value comprises:
   calculating the second allowable curvature radius using the following calculation formula: (½×the panel arc length)÷(((½× the panel arc length)÷the optimal viewing distance)−the second allowable value);
   wherein the second allowable value is greater than the allowable value.

6. The method for manufacturing a curved autostereoscopic display as claimed in claim 5, wherein the step of determining the actual curvature radius of the curved panel based on the optimal viewing distance or the allowable curvature radius comprises:
   using the second allowable curvature radius as the actual curvature radius of the curved panel if the optimal viewing distance and the allowable curvature radius cannot be used as the actual curvature radius of the curved panel.

7. The method for manufacturing a curved autostereoscopic display as claimed in claim 5, wherein the second allowable value is between 0 and 10°.

8. The method for manufacturing a curved autostereoscopic display as claimed in claim 5, wherein the allowable value is 3°, and the second allowable value is 5°.

9. A method for manufacturing a curved autostereoscopic display, comprising:
   providing a curved panel, wherein the curved panel has a panel arc length and a resolution;
   obtaining an optimal viewing distance based on the arc length of the curved panel and the resolution;
   determining an allowable curvature radius of the curved panel based on the panel arc length, the optimal viewing distance and an allowable value; and
   using the allowable curvature radius as an actual curvature radius of the curved panel.

10. The method for manufacturing a curved autostereoscopic display as claimed in claim 9, further comprising:
    determining whether using the allowable curvature radius as the actual curvature radius of the curved panel meets the process conditions or not;
    determining a new allowable value if using the allowable curvature radius as the actual curvature radius of the curved panel does not meet the process conditions; and
    determining a new allowable curvature radius based on the new allowable value.

11. The method for manufacturing a curved autostereoscopic display as claimed in claim 10, wherein the new allowable value is greater than the allowable value.

12. The method for manufacturing a curved autostereoscopic display as claimed in claim 10, wherein if the original allowable value is 3°, the new allowable value is 5°.

13. The method for manufacturing a curved autostereoscopic display as claimed in claim 10, further comprising:
    repeating the step of determining whether using the allowable curvature radius as the actual curvature radius of the curved panel meets the process conditions or not, the step of determining a new allowable value if using the allowable curvature radius as the actual curvature radius of the curved panel does not meet the process conditions, and the step of determining a new allowable curvature radius based on the new allowable value, until using the allowable curvature radius as the actual curvature radius of the curved panel meets the process conditions.

14. The method for manufacturing a curved autostereoscopic display as claimed in claim 10, further comprising:
    using the allowable curvature radius as the actual curvature radius if the allowable curvature radius meets the process conditions.

15. A curved autostereoscopic display, comprising:
    a curved panel, having a panel arc length and an actual curvature radius;
    wherein the actual curvature radius is an allowable curvature radius;
    wherein the allowable curvature radius is greater than an optimal viewing distance,
    wherein the optimal viewing distance is obtained based on the panel arc length and a resolution of the curved panel.

16. The curved autostereoscopic display as claimed in claim 15, wherein the allowable curvature radius is: (½×the panel arc length)÷(((½×the panel arc length)÷the optimal viewing distance)−an allowable value).

17. The curved autostereoscopic display as claimed in claim 16, wherein the allowable value is between 0 and 10°.

18. The curved autostereoscopic display as claimed in claim 16, wherein the allowable value is between 0 and 5°.

19. The curved autostereoscopic display as claimed in claim 16, wherein the allowable value is 3°.

20. The curved autostereoscopic display as claimed in claim 16, wherein the allowable value is 5°.

* * * * *